US008056000B2

(12) United States Patent
Vidyarthi et al.

(10) Patent No.: US 8,056,000 B2
(45) Date of Patent: Nov. 8, 2011

(54) APPARATUS AND SYSTEM FOR AN AUTOMATED BIDIRECTIONAL FORMAT TRANSFORM

(75) Inventors: Suraksha Vidyarthi, Fremont, CA (US); Piotr Przybylski, San Carlos, CA (US)

(73) Assignee: International Business Machines Corporation, Armonk, NY (US)

( * ) Notice: Subject to any disclaimer, the term of this patent is extended or adjusted under 35 U.S.C. 154(b) by 1107 days.

(21) Appl. No.: 11/845,571

(22) Filed: Aug. 27, 2007

(65) Prior Publication Data

US 2009/0063956 A1 Mar. 5, 2009

(51) Int. Cl.
G06F 15/00 (2006.01)
(52) U.S. Cl. ............... 715/239; 715/249; 707/E17.001
(58) Field of Classification Search .............. 715/239, 715/249; 707/E17.001
See application file for complete search history.

(56) References Cited

U.S. PATENT DOCUMENTS

| | | | |
|---|---|---|---|
| 5,873,075 A | 2/1999 | Cochrane et al. | |
| 6,453,314 B1 | 9/2002 | Chan et al. | |
| 6,499,036 B1 | 12/2002 | Gurevich | 707/103 |
| 6,651,243 B1 | 11/2003 | Berry et al. | |
| 6,654,753 B1 | 11/2003 | Arda et al. | |
| 6,658,428 B2 | 12/2003 | Sokol et al. | |
| 6,665,662 B1 | 12/2003 | Kirkwood et al. | 707/3 |
| 6,711,624 B1 | 3/2004 | Narurkar et al. | 709/321 |
| 6,867,782 B2 | 3/2005 | Gaudette et al. | |
| 6,883,170 B1 | 4/2005 | Garcia | |
| 6,924,821 B2 | 8/2005 | Trinh et al. | |
| 7,111,194 B1 | 9/2006 | Schoenthal et al. | |
| 7,155,440 B1 | 12/2006 | Kronmiller et al. | |
| 7,197,512 B2 | 3/2007 | Pharies et al. | 707/103 |
| 7,412,455 B2 | 8/2008 | Dillon | |
| 7,457,817 B2 | 11/2008 | Krishnaswamy et al. | |
| 7,603,366 B1 | 10/2009 | Gritsay et al. | |
| 7,603,368 B2 * | 10/2009 | Super et al. | 1/1 |
| 2002/0147731 A1 | 10/2002 | Seestrom et al. | 707/104.1 |
| 2003/0101169 A1 | 5/2003 | Bhatt et al. | |
| 2003/0101194 A1 | 5/2003 | Rys et al. | |
| 2003/0177114 A1 | 9/2003 | Lin et al. | |

(Continued)

FOREIGN PATENT DOCUMENTS

EP 1117049 7/2001

(Continued)

OTHER PUBLICATIONS

Welcome to the IBM WebSphere® Host Access Trandformation Services (HATS) V6 Information Center, http://publib.boulder.ibm.com/infocenter/hatshelp/v60/index.jsp?topic=/com.ibm.hats.doc/common_swg/welcome_template/websphere/WebSphereHats.htm.

(Continued)

Primary Examiner — Stephen Hong
Assistant Examiner — Marshon Robinson
(74) Attorney, Agent, or Firm — Kunzler Needham Massey & Thorpe

(57) ABSTRACT

An apparatus and system are disclosed for receiving a data set from a data-exchange server, generating methods for accessing and performing operations on data in the data set from metadata defining the data set, using the access methods to generate a method for transforming the bidirectional format of the text data between the format of the server and a format defined in the metadata of the data set, and automatically employing the transformation method to transform the bidirectional format of text data in the data set, prior to performing an operation on the data, to the format appropriate to the particular operation.

6 Claims, 3 Drawing Sheets

U.S. PATENT DOCUMENTS

| | | | |
|---|---|---|---|
| 2003/0195765 A1 | 10/2003 | Sehga et al. | 705/1 |
| 2004/0083222 A1 | 4/2004 | Pecherer | |
| 2004/0117513 A1 | 6/2004 | Scott | 710/1 |
| 2004/0199577 A1 | 10/2004 | Burd et al. | |
| 2005/0027732 A1 | 2/2005 | Kalima | |
| 2005/0080755 A1 | 4/2005 | Aoyama | 707/1 |
| 2005/0091252 A1 | 4/2005 | Liebich et al. | |
| 2005/0131964 A1 | 6/2005 | Saxena | |
| 2005/0171966 A1 | 8/2005 | Rath et al. | 707/101 |
| 2005/0202392 A1* | 9/2005 | Allen et al. | 434/362 |
| 2005/0246435 A1 | 11/2005 | Choudhary et al. | 709/223 |
| 2006/0056301 A1 | 3/2006 | Soncodi | |
| 2006/0059496 A1 | 3/2006 | Joy et al. | |
| 2006/0095288 A1 | 5/2006 | Amys et al. | 705/1 |
| 2006/0101474 A1* | 5/2006 | Magown | 719/315 |
| 2006/0259909 A1 | 11/2006 | Passero et al. | 719/312 |
| 2006/0282439 A1 | 12/2006 | Allen et al. | 707/100 |
| 2007/0016915 A1 | 1/2007 | Mukundan et al. | 719/330 |
| 2008/0085502 A1* | 4/2008 | Allen et al. | 434/365 |

FOREIGN PATENT DOCUMENTS

| | | |
|---|---|---|
| WO | WO9915979 | 4/1999 |

OTHER PUBLICATIONS

Using the HATS Bidirectional API, http://publib.boulder.ibm.com/infocenter/hatshelp/v60/topic/com.ibm.hat.

Adapter Pattern, from Wikipedia, the free encyclopedia, http://en.wikipedia.org/wiki/Adapter_pattern.

ICS Technical Support Services, "Stored Procedures", ICS Support Oct. 2001, http://web.archive.org/web/20011005162453/http://www.ics.com/support/docs/dx/1.5/stored.html, ICS Support, Oct. 2001.

* cited by examiner

APPARATUS AND SYSTEM FOR AN AUTOMATED BIDIRECTIONAL FORMAT TRANSFORM

BACKGROUND OF THE INVENTION

1. Field of the Invention

This invention relates to data exchange adapters for use in exchanging data between a server and a backend application and more particularly relates to automatically transforming bidirectional format values in a data set prior to an exchange between a server and a backend application.

2. Description of the Related Art

The ability to seamlessly integrate the various applications and technologies necessary to perform tasks essential to the running of a business is known as business integration. Data exchange adapters facilitate business integration by allowing sets of data to be exchanged, seamlessly, among various applications and technologies. The Java 2 Enterprise Edition (J2EE) standard defines a standard approach to building these data exchange adapters as outlined in the J2EE connector architecture (JCA) specification.

Advanced implementations of data exchange adapters include an application module with a Data Exchange Service Programming Interface (DESPI) running on a Data Exchange Service Module (DESM) that is metadata-driven. The DESM is not hard-coded to perform unique transforms based on a particular application, technology, or object type. Rather, the DESM discovers the structure of a data set from the representation of the data set in associated metadata. In one embodiment, at build time, the DESM constructs access methods for managing the data set from associated metadata. At runtime, a connector component uses the access methods generated by the DESM to access elements of the data set and execute, on those elements, instructions for operations carried by the data set with application or technology specific methods embedded in the connector component.

Metadata used to define data sets contains a string of five letters known as a bidirectional format. The bidirectional format drives the processing of text data within the associated data set, according to the values in each position of the five-letter string comprising the bidirectional format. For example, a letter in the second position of the five-position format string determines whether text is processed from left to right, as is the case with English, or right to left, as is the case with Hebrew.

In order to accomplish business integration, a server makes a data set available to various applications and technologies. However, the bidirectional format required by a backend application or technology may differ from the bidirectional format required by the server. For example, servers may operate on a single, common standard for bidirectional format, such as a Windows™ bidirectional format. Therefore, the bidirectional format required on a backend application or technology may differ from the bidirectional format employed by the server.

Consistency requires transforming the text data of a data set as the text data is passed between the differing bidirectional contexts of a server and that of backend applications and/or technologies. Previous solutions rely upon the building of an application or technology specific transform within a connector component specific to a single application or technology. With this approach, multiple applications and technologies require the writing of code for several bidirectional format transforms, one for each application and for each technology having a different bidirectional format. Generating several transforms creates complexity that can lead to integration problems, debugging problems, and difficulty in assigning development tasks.

DESPI, in some embodiments running on a DESM, simplifies the way in which text data may be transformed to a context appropriate bidirectional format. Because the access methods generated by the DESM are application and technology neutral, the access methods may be used to create a single transform that can automatically transform text in a data set to make the text bidirectionally appropriate to its context.

SUMMARY OF THE INVENTION

From the foregoing discussion, it should be apparent that a need exists for an apparatus and a system that provide a single transform for data exchange to make the bidirectional format of text data context appropriate, regardless of the number of servers, applications, and technologies involved in the process of business integration. Beneficially, such an apparatus and system would automatically perform this transform based solely on metadata specific to the data set involved in a data exchange.

In one embodiment of the present invention, a computer program product includes computer-usable code for receiving a data set from a server and traversing metadata associated with that data set. The computer-usable program code also generates access methods, one access method is comprised of a cursor and another accessing method is comprised of an accessor, for each node of the data set. The cursors are configured to facilitate both input and output operations on the data set, with the cursors acting as iterators to provide reading and writing access to hierarchically defined fields and the accessors providing reading and writing access to individual fields.

In response to encountering a bidirectional format in the metadata of the data set, the computer-usable code generates wrappers for each instance in which a cursor executes an input operation or an output operation or an accessor executes an input operation or an output operation. Prior to performing each input operation, the computer-usable program code uses the wrappers to automatically transform text data from an original bidirectional format associated with the server to the destination bidirectional format embedded in the metadata for backend applications or technologies. Also, prior to performing each output operation, the computer-usable code uses wrappers to automatically transform text data from the destination bidirectional format to the original bidirectional format associated with the server.

By referencing metadata that defines a data set, the present invention is able to automatically perform transformations of the bidirectional format of text data with a single transform. The metadata generated cursors and accessors provide pathways for accessing a data set and performing operations on text data in that data set that are application, server, and technology neutral. The wrappers generated around the cursors and accessors further provide a way to transform text data to a context appropriate format that is application, server, and technology neutral.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawing. Understanding that this drawing depicts only typical embodiments of the invention and is not, therefore, to be considered to be limiting of its scope, the invention will be described and explained with additional specificity and detail through the use of the accompanying drawing, in which.

DETAILED DESCRIPTION OF THE INVENTION

Figure 1:
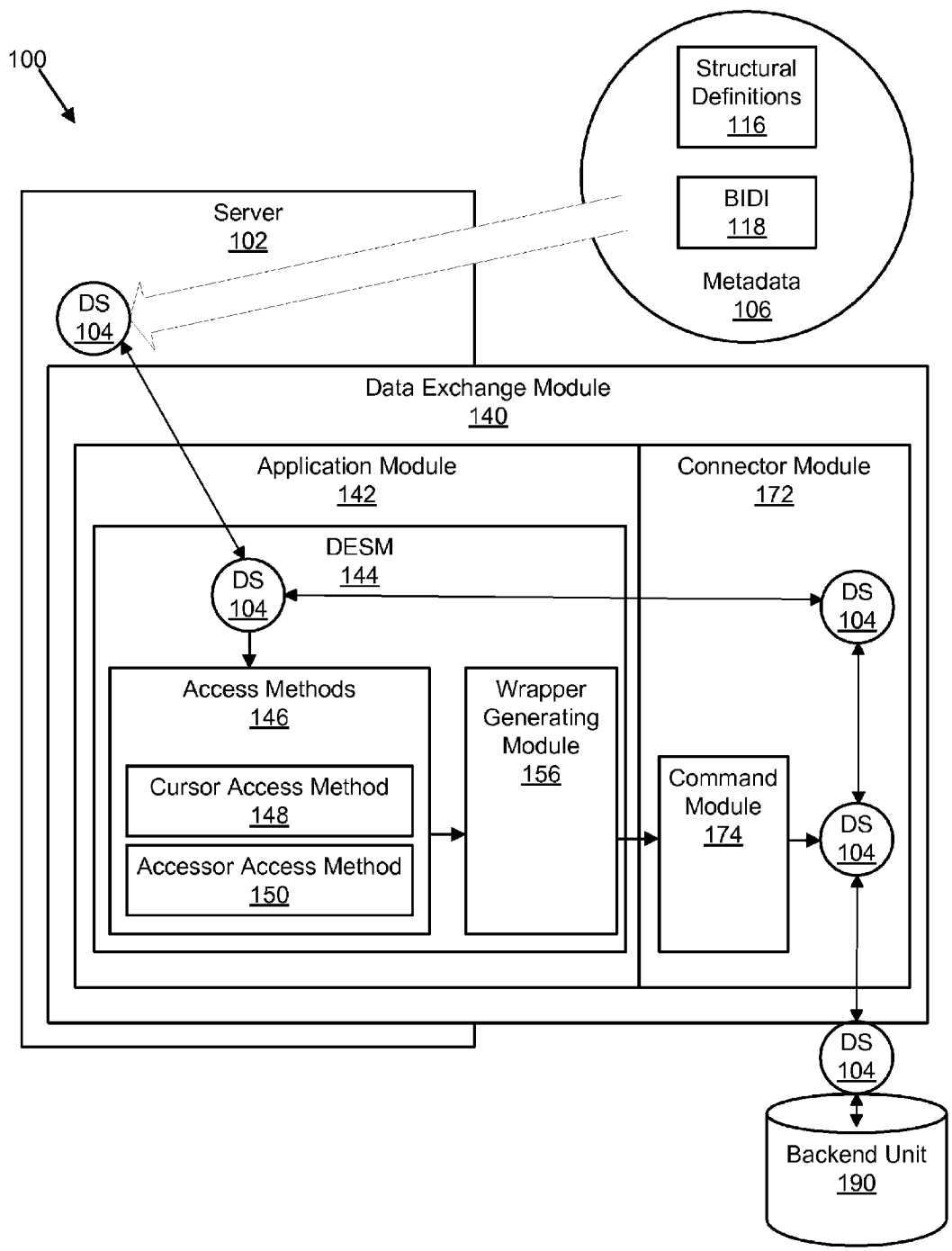
FIG. 1 is a schematic block diagram illustrating one embodiment of an automated bidirectional format transform system, in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is a schematic block diagram illustrating one embodiment of a system 100 to automatically transform text data to a context appropriate bidirectional format. In one embodiment, the system 100 includes: a Server 102; a Data Exchange Module 140, comprising an Application Module 142, a Connector Module 172, and a Backend Unit 190. The Data Exchange Module 140 may include additional logic or may simply designate the relationship between the Application Module 142 and the Connector Module 172. Of course, as will be recognized by one of ordinary skill in the art, numerous configurations of the system 100 are possible which, in various embodiments, may include additional Servers 102 and Backend Units 190, comprised of various applications and/or technologies.

The Server 102 makes a Data Set 104 available to the Backend Unit 190. The Server 102 may be a process server, an application server, or a combination of servers. The Data Set 104 is an structure of data formatted for the Server 102 and may be a Service Data Object ("SDO"), streaming data, or other form of structured data. The Data Set 104 is defined by Metadata 106, which has the structure of a SDO defined by an Extensible Markup Language Schema Definition ("XSD").

The Metadata 106 includes a Structural Definition 116 and a Bidirectional Format Indicator ("BIDI") 118. The BIDI 118 provides processing information for text data, such as whether to process the text from left to right or from right to left. These components, among others, define the Data Set 104.

In certain embodiments, the Data Exchange Module 140 receives the Data Set 104 to carry out an operation or operations on the Data Set 104. The Application Module 142 uses the DESM 144 to traverse the Metadata 106 defining the Data Set 104 and to discover the hierarchical structure of the Data Set 104. At build time, in certain embodiments, the DESM 144 uses the Structural Definition 116 in the Metadata 106 to construct Access Methods 146 for the Data Set 104.

In certain embodiments, the Access Methods 146 include a Cursor Access Method 148 and an Accessor Access Method 150. The Cursor Access Method 148 generates a Cursor (not shown) for each Object Node (not shown). The Accessor Access Method 150 generates an Accessor (not shown) for each Field (not shown). The relationship between Cursors (not shown), Accessors (not shown), Objects (not shown) and Fields (not shown) is clarified in FIG. 2 below.

Figure 2:
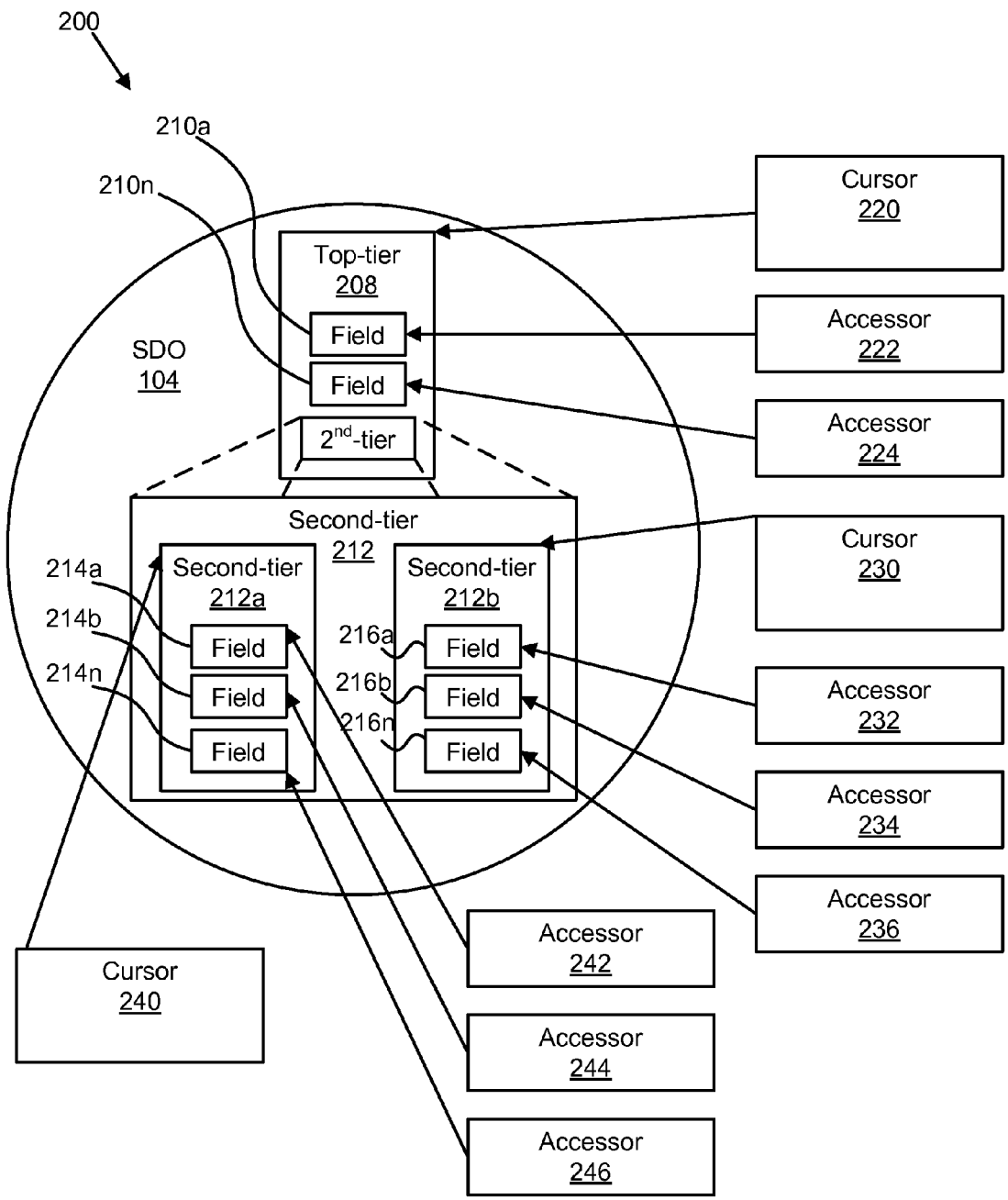
FIG. 2 is a schematic block diagram illustrating the relationships between objects and fields in a service data object and various cursors and accessors, in accordance with one embodiment of the present invention.
Figure 3A:
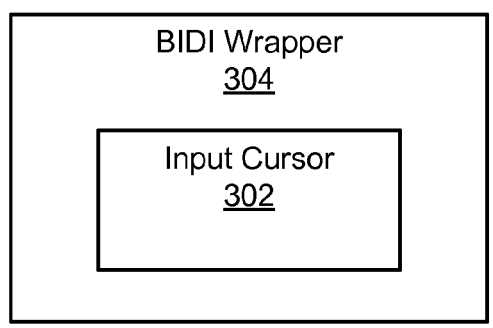
FIGS. 3a-3d are schematic block diagrams illustrating the relationships between a cursor or an accessor and a bidirectional format wrapper, in accordance with one embodiment of the present invention.
Figure 3B:
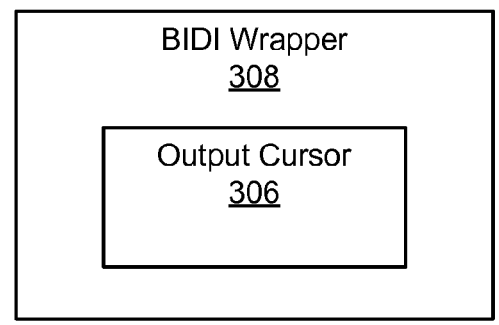
Figure 3C:
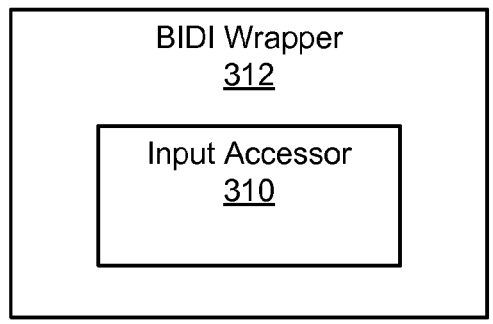
Figure 3D:
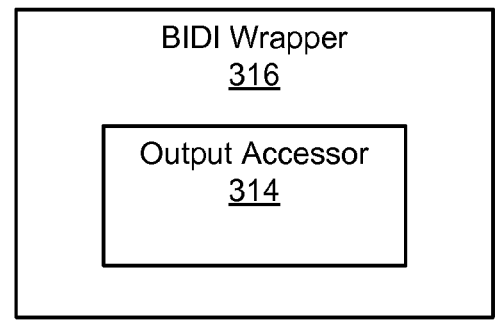

FIG. 2 illustrates the relationships 200 between objects and fields in a Data Set 104 defined as a Service Data Object ("SDO") and various Cursors and Accessors, in one embodiment of the present invention. The SDO 204 includes a Top-tier Object 208. A Top-tier Object 208 is an object that has child nodes in the hierarchy of nodes defined in the SDO 204. In one embodiment, a plurality of Fields 210*a-n* descend from the Top-tier Object 208. A plurality of Second-tier Objects 212*a-n* may also descend from the Top-tier Object 208.

Each Second-tier Object 212*n* may also have a series of Second-tier Fields 214*a-n*, 216*a-n*. In certain embodiments, Third-tier and Higher-tier Objects (not shown) have similar structures. The Cursor Access Method 148 generates a Cursor 220, 230, 240 for each Object Node 208, 212*a*, 212*b*. A Cursor 220, 230, 240 provides iterative logic for accessing data in the Fields 210*a-n*, 214*a-n*, 216*a-n*. The Accessor, Access Method 150 generates an Accessor 222, 224, 232, 234, 236, 242, 244, 246 for each Field 210*a-n*, 214*a-n*, 216*a-n* that provides logic for accessing data values in the Field 210*a-n*, 214*a-n* for reading and writing.

The Data Set 104 may carry input and/or output operations. For each possible input operation, the Cursor Access Method 148 generates an Input Accessor (not shown) and the Accessor Access Method 150 generates a Input Accessor (not shown). Conversely, for each possible output operation, the Cursor Access Method 148 generates an Output Accessor (not shown) and the Accessor Access Method 150 generates a Output Accessor (not shown).

Returning now to FIG. 1. In certain embodiments, as the DESM 144 traverses the Metadata 106, the DESM 144 discovers a BIDI 118 embedded in the Metadata 106. In one embodiment, at the discovery of the BIDI 118, the Wrapper Generating Module 156 automatically generates a BIDI Wrapper (not shown) for each Cursor 220, 230, 240 and Accessor 222-46. FIG. 3 clarifies the relationship.

FIG. 3 illustrates the relationship 300 between a Cursor 220, 230, 240 or an Accessor 222-46 and its BIDI Wrappers. FIG. 3*a* depicts an Input Cursor 302 with its accompanying BIDI Wrapper 304. FIG. 3*b* depicts an Output Cursor 306 with its accompanying BIDI Wrapper 308. FIG. 3*c* depicts an Input Accessor 310 with its accompanying BIDI Wrapper 312. FIG. 3*d* depicts an Output Accessor 314 with its accompanying BIDI Wrapper 316.

Returning now to FIG. 1, by way of an example, an operation to populate a Field results in an Input Accessor, used to write data in the Data Set 104 stored on the Backend Unit 190. Conversely, a retrieval operation for data of a specific Field results in both an Input Accessor 310 and an Output Accessor 314 to pass the data to the Server 102. The Connector Module 172 of the Data Exchange Module 140 includes a Command Module 174 with methods (not shown) specific to a particular Backend Unit 190.

In one embodiment, the Connector Module 172 uses a Java Development Kit Application Programming Interface ("JDKAPI") to execute the BIDI Wrappers 312, 316. The JDKAPI executes BIDI Wrappers 312, 316 to adjust the bidirectional format of the text data in the relevant Fields 112*a-n* to a context-appropriate bidirectional format, determined by whether the BIDI Wrappers 312, 316 are wrapped around an Input Cursor 302, an Output Cursor 306, an Input Accessor 310, or an Output Accessor 314. In another embodiment, the DESM 144 transforms text data values with the help of the JDKAPI within the Wrapper Generating Module 156. In yet another embodiment, the Wrapper Generating Module 156 performs the transformation.

Whenever an Input Cursor 302 or an Input Accessor 310 is involved, the bidirectional format is transformed to the bidirectional format appropriate to the Backend Unit 190. This bidirectional format is defined in the BIDI 118 residing in the Metadata 106. Whenever an Output Cursor 306 or an Output Accessor 314 is involved, the bidirectional format is transformed to the bidirectional format appropriate to the Server 102. Therefore, whenever the Metadata 106 contains a BIDI 118, the Connector Module 172, the DESM 144 or the Wrapper Generating Module 156 automatically make the text data in the Data Set 104 appropriate to the context required by the operations to be performed on the Data Set 104, whether that context is defined by the Server 102 or a Backend Unit 190.

In certain embodiments, during build time, the Command Module 174 of the Connector Module 172 receives Input Cursors 302, Output Cursors 306, Input Accessors 310, and Output Accessors 314 after their BIDI Wrappers 312, 316 have been executed and translates each underlying Cursor and Accessor 302, 306, 310, 312 to command method(s) (not shown) specific to the application or the technology of the relevant Backend Unit 190. In certain embodiments, the translation can be done with reference to an application programming interface ("API") specific to the particular backend application or technology making up the Backend Unit 190. In certain embodiments, during runtime, the Connector Module 172 executes the series of backend specific commands necessary to perform the required operations on the Data Set 104. In another embodiment, the Command Module 174 executes the series of backend specific commands. The backend specific commands are executed on text fields that have previously been adjusted to a context appropriate format.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising a computer readable medium having computer usable program code executable to perform operations for automatically transforming string data from one bidirectional format into string data of another bidirectional format within a Data Exchange Service Programming Interface (DESPI), the operations of the computer program product comprising:

receiving a data set from a server, wherein the data set is configured for processing by a data exchange module, the data exchange module comprising a connector module and an application module, the application module comprising a DESPI;

traversing metadata associated with the data set;

generating cursors for each object node and accessors for each field node defined in the metadata of the data set, the cursors and the accessors configured to execute both input and output data exchange operations on the data set;

generating input cursor wrappers, output cursor wrappers, input accessor wrappers and output accessor wrappers for each node of the data set, in response to encountering a destination bidirectional format in the metadata of the data set defined for that node; and transforming, automatically, text data for nodes associated with input accessor wrappers from an original bidirectional format to the destination bidirectional format by way of the input accessor wrappers; and transforming, automatically, text data for nodes associated with input cursor wrappers from an original bidirectional format to the destination bidirectional format by way of the input cursor wrappers.

2. The computer program product of claim 1, further comprising transforming, automatically, text data for nodes associated with output accessor wrappers from the destination bidirectional format to the original bidirectional format by way of the output accessor wrappers.

3. The computer program product of claim 1, further comprising further comprising transforming, automatically, text data for nodes associated with output cursor wrappers from the destination bidirectional format to the original bidirectional format by way of the output cursor wrappers.

4. A system to automatically transform values for bidirectional format data within a Service Data Object ("SDO"), the system comprising:

a server configured to exchange a SDO with an Enterprise Information System ("EIS");

an Extensible Markup Language Schema Definition ("XSD") associated with the SDO, the XSD setting forth a particular bidirectional format for processing string data values in the fields of the SDO, the XSD satisfying a Data Exchange Service Programming Interface ("DESPI");

an application module comprising a Data Exchange Services Module ("DESM") configured to traverse the XSD, to generate cursors for each object node and accessors for each field node defined in the XSD, the cursors and the accessors comprising both input cursors and output cursors for the SDO;

a wrapper generating module within the DESM that generates input cursor BIDI wrappers, output cursor BIDI wrappers, input accessor BIDI wrappers and output accessor BIDI wrappers for each node of the SDO in response to the DESM encountering a destination bidirectional format in the process of traversing the XSD, the input cursor, output cursor, input accessor, and output accessor BIDI wrappers configured to transform, automatically, text data accessed by the input cursor and the input accessor from an original bidirectional format to the destination bidirectional format and text data accessed by the output cursor and the output accessor from the destination bidirectional format to the original bidirectional; and a connector module configured to execute one of the input cursor BIDI wrapper and input accessor BIDI wrapper in response to a write request for the SDO and to execute one of the output cursor BIDI wrapper and output accessor BIDI wrapper in response to a read request for the SDO.

5. The system of claim 4, wherein the server is a processes server.

6. The system of claim 4, wherein the system further comprises a plurality of servers.

* * * * *